(12) United States Patent
Cilliers

(10) Patent No.: US 8,277,147 B2
(45) Date of Patent: Oct. 2, 2012

(54) METHOD FOR REPLACING PIPES, AND APPARATUS THEREFOR

(76) Inventor: Kobus Jacobus Hendrik Cilliers, Birmingham (GB)

(*) Notice: Subject to any disclaimer, the term of this patent is extended or adjusted under 35 U.S.C. 154(b) by 248 days.

(21) Appl. No.: 12/519,345

(22) PCT Filed: Dec. 17, 2007

(86) PCT No.: PCT/GB2007/004844
§ 371 (c)(1),
(2), (4) Date: Jun. 15, 2009

(87) PCT Pub. No.: WO2008/071997
PCT Pub. Date: Jun. 19, 2008

(65) Prior Publication Data
US 2010/0032045 A1   Feb. 11, 2010

(30) Foreign Application Priority Data

Dec. 15, 2006   (GB) .................................. 0626051.7
Feb. 1, 2007    (GB) .................................. 0701875.7

(51) Int. Cl.
*F16L 55/18*    (2006.01)

(52) U.S. Cl. ..................... 405/184.1; 405/184.2; 138/97

(58) Field of Classification Search ............... 405/184.1, 405/184.2, 184.3, 184; 138/97
See application file for complete search history.

(56) References Cited

U.S. PATENT DOCUMENTS

| | | | |
|---|---|---|---|
| 4,637,756 A * | 1/1987 | Boles ..................... | 405/184.1 |
| 5,013,188 A | 5/1991 | Campbell et al. | |
| 5,112,158 A * | 5/1992 | McConnell ............... | 405/184.3 |
| 5,282,696 A * | 2/1994 | Solomon et al. .......... | 405/184.1 |

FOREIGN PATENT DOCUMENTS

| | | |
|---|---|---|
| EP | 0913621 | 5/1999 |
| EP | 1092901 | 4/2001 |

* cited by examiner

*Primary Examiner* — Frederic L Lagman
(74) *Attorney, Agent, or Firm* — Pedersen and Company, PLLC; Ken J. Pedersen; Barbara S. Pedersen

(57) ABSTRACT

This invention relates to a method for replacing pipes, and an apparatus therefor. The method utilizes a cable which is passed along an existing pipe. The cable is connected to a component at the end of the pipe, the component also being connected to a length of replacement pipe. The cable is pulled whereby the existing pipe is removed and the replacement pipe inserted in its place. The invention is expected to achieve its greatest utility as a method and apparatus for replacing pipes carrying water or gas to domestic and commercial properties.

8 Claims, 1 Drawing Sheet

METHOD FOR REPLACING PIPES, AND APPARATUS THEREFOR

FIELD OF THE INVENTION

This invention relates to a method for replacing pipes, and apparatus therefor. The invention is expected to achieve its greatest utility as a method and apparatus for replacing pipes carrying water or gas to domestic and commercial properties, and the following description will refer primarily to those applications. The invention is not thereby limited to these applications.

BACKGROUND OF THE INVENTION

Water and gas are supplied to domestic and commercial properties by way of large (mains) pipes which are laid by the utility suppliers. Smaller pipes connect the mains pipe to the individual building or dwelling. To enable the water or gas supply to be cut off from a particular building (in the event of a leak upon that property), the smaller pipes contain a valve or stopcock, the stopcock usually being located at the edge of the users property, for example at the end of the driveway serving the property.

It is periodically necessary to replace the pipes serving a property, for example the pipe providing water to the property may become damaged, or it may become insufficient if the water consumption for the property grows beyond the capacity of the pipe. Also, many pipes providing water to older homes are made of lead which is no longer acceptable on health grounds.

DESCRIPTION OF THE PRIOR ART

One method of replacing an existing pipe is to dig a trench along the line of the pipe and to physically remove the existing pipe and replace it with a new pipe. Clearly, digging a trench is an expensive and time-consuming activity, and can result in damage to the property and/or to a garden or driveway under which the existing pipe passes.

To avoid the problems associated with digging a trench, several alternative "trenchless" methods are available. One such method employs a "mole", which is a device which can create a hole through earth by way of repeated small movements induced by pneumatic pressure. The mole is around 1 meter long, and it is necessary to did an entry hole and an exit hole for the mole which are both large enough to accommodate it The entry and exit holes must also both be dug to the depth of the pipe and the mole is then placed in the entry hole and aimed at the exit hole. The mole creates a hole through which the replacement pipe is passed, the existing pipe being left in place and merely "bypassed" by the replacement pipe. The requirement to dig a large entry and exit holes avoids much of the advantage of not digging a trench, particularly for shorter existing pipes to be replaced, and in particular creates a considerable mess within the building.

A mole cannot be used (or at least cannot be used safely) near other services such as underground electric cables. Also, if the mole encounters an obstruction it can deviate from its chosen path and miss the exit hole.

It is also possible to use a directional drilling technique but that is very expensive and is therefore seldom employed in replacing gas or water pipes to a building such as a domestic dwelling.

Another trenchless method is to first locate the ends of pipe, i.e. the pipe is cut where it enters the building creating an open "internal" end of the pipe to be replaced. The pipe is then also cut adjacent to the stopcock (or else the stopcock is removed) creating an open "external" end of the pipe. A cable or rod is then passed along the pipe, usually from the external end to the internal end. When the cable reaches the internal end of the pipe it is secured to a "splitter". The splitter is also secured to the end of the replacement pipe.

The splitter is a tool which has a tapered leading end and a central portion which is larger than the inside diameter of the existing pipe. The exact form of the splitter will depend upon the material of the existing pipe, but it can for example include a blade to cut open the existing pipe.

The cable or rod is then pulled back through the existing pipe, and the splitter causes the existing pipe to split or otherwise break open, permitting the replacement pipe to be pulled through the hole created by the split existing pipe.

It is recognised that a relatively large force is sometimes required to split the existing pipe and force the split pipe outwardly by a sufficient distance to accommodate the splitter and the replacement pipe, but such a force (sufficient to pull the splitter and replacement pipe through earth over a length of many meters for example) can be obtained relatively easily. If, however, the existing pipe passes through a hard material such as brickwork or concrete it is usually necessary to forcibly remove the hard material from around the existing pipe before pulling the splitter along the pipe.

The construction of the splitter, and also the relative thickness of the pipe wall compared to the internal diameter of the pipe, means that this method is in practice used only for larger pipes, for example over 10 cm in diameter. Even if this method were suitable for smaller pipes such as those providing water and gas to domestic dwellings, the ends of the split pipe must be removed after the splitting operation has been completed, otherwise the ends will be unsightly and potentially dangerous (if within the building), and may provide an obstacle to fitment of the stopcock to the replacement pipe. Care must also be taken when removing the ends of the split pipe not to damage the replacement pipe.

SUMMARY OF THE INVENTION

The inventor has therefore realised that a better method for replacing pipes is required, which method avoids or reduces the above-stated disadvantages.

According to the invention, there is provided a method of replacing an existing pipe, including the steps of:
{i} locating the ends of the existing pipe to be replaced;
{ii} opening the ends of the existing pipe to define a first end and a second end;
{iii} connecting a cable to a component at the second end, the component also being connected to a replacement pipe;
{iv} passing the cable along the existing pipe;
{v} pulling the cable from the first end;
characterised in that the component is adapted to engage the second end of the existing pipe, and in that the step of pulling the cable from the first end acts to remove the existing pipe.

In steps {iii} and {iv} the cable can be connected to the component at the second end and then passed along the existing pipe from the second end to the first end, or else the cable can be passed along the existing pipe from the first end to the second end and then connected to the component at the second end.

The inventor has realised that it is possible to provide sufficient force to pull out the existing pipe at the same time as inserting the replacement pipe. Specifically, a typical water supply pipe to a domestic dwelling may have a length of up to around 20 meters between the stopcock at the edge of the property and its entry into the building. The existing pipe will typically pass through earth for most of its length and the force to remove the pipe and insert a replacement pipe will usually be less than 2 tonnes, which force can readily be provided by an electric or manual winch.

The invention therefore avoids a major disadvantage of the trenchless methods described above, in which methods the existing pipe remains in the ground. If the existing pipe is of lead, then replacing it with a pipe of another material will prevent continued contamination of the water supply to the building, but the pipe will still be liable to contaminate ground water. By removing the existing pipe as part of the replacement procedure the inventor avoids that major environmental problem, and also utilises the existing pipe hole.

The method will work with most pipe materials in the typical situation that the existing pipe includes one or more bends. Specifically, an existing pipe of plastic, lead or copper can usually be forced around any bends which occur along its length, although more rigid materials such as steel may require additional excavation adjacent any bends (although it is recognised that steel is not a common material for water and gas pipes because of the difficulty of bending it into place).

The inventor has furthermore realised that when pulling out the existing pipe the greatest restriction is the friction between the pipe and the surrounding earth. This manifests itself in an initially secure retention of the existing pipe, which it is necessary to overcome. Once the initially secure retention is overcome, however, and the pipe starts to move within its hole, the force required to move it is reduced. The present invention takes advantage of the inherent compressibility/deformability of the existing pipe, so that when tension is first put upon the cable (or rod, if used) it is only the pipe adjacent the second end which is forced to move, that end of the pipe compressing or deforming under the applied tension and becoming free of its hole before the tension force is transferred to the next section of the existing pipe. The maximum force to release the initially secure retention of the existing pipe is therefore imparted gradually along the whole length of the pipe and not instantaneously upon the whole length together, so that the maximum force required to remove the existing pipe is not substantially greater than the force required to split the existing pipe.

With certain types of existing pipe, in particular an existing pipe of lead for example, it has been discovered that the pipe can deform and distort to such an extent ahead of the component that it forms a "ball" of material of relatively large size. In certain circumstances the "ball" of material can have a cross-sectional dimension much greater than the existing pipe, and greater than the component.

This is disadvantageous as it causes the force which is required to remove the existing pipe to increase considerably, and it also results in a hole through the earth which is much larger than the replacement pipe.

In order to reduce the likelihood of the existing pipe distorting to such an extent the present improvement proposes the additional method steps of: {i} injecting a settable fluid into the pipe, and {ii} allowing the settable fluid to set, after the cable has been passed along the pipe.

The settable fluid can be cementitious such as mortar, grout or the like, or it can be a gel or other material which will harden relatively quickly, and which will harden to a sufficient extent so as to provide support for the wall of the existing pipe as it is pulled through the earth.

It will be appreciated that any non-compressible fluid such as water could provide support for the wall of the existing pipe, but a liquid of anything other than extremely high viscosity is not suitable because it would require the ends of the existing pipe to be sealed against leakage, and even if the ends were sealed the liquid would be lost if the existing pipe were to split or fracture.

Thus, whilst it is not necessary that the settable fluid set into a rigid material, it is necessary that it sets sufficiently not to leak from the (unsealed) ends of the existing pipe, or from any split or fracture in the pipe.

Clearly, if the settable fluid sets into a rigid material this will increase the force which is required to distort the existing pipe around bends, and for this reason also a settable fluid which does not set into a rigid material is desired.

There is also provided an apparatus for replacing pipes comprising a cable for insertion into the existing pipe, a component for fitment to the end of the cable, and a winch for pulling the cable, characterised in that the component for fitment to the cable has an abutment surface adapted to engage an end of the existing pipe.

Preferably, the abutment surface is surrounded by a collar adapted to surround the end of the existing pipe. Desirably the collar is externally tapered so as to reduce its resistance to movement through earth.

Preferably, the component has a larger cross-sectional dimension than the replacement pipe, so that the component forms a larger hole in the earth than is required to accommodate the replacement pipe, and the resistance to movement of the replacement pipe is reduced.

BRIEF DESCRIPTION OF THE PREFERRED EMBODIMENTS

The invention will now be described in more detail, by way of example, with reference to the accompanying drawings, in which.

DETAILED DESCRIPTION

Figure 1:
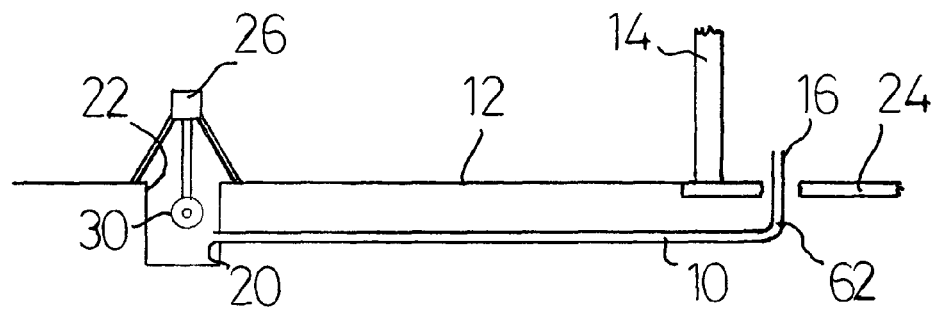
FIG. 1 shows a schematic representation of an arrangement for removing an existing pipe.

The invention is adapted for use in replacing an existing pipe 10 from its location underneath the ground 12. FIG. 1 shows a typical situation in which the invention may be utilised where the existing pipe 10 is connected to the mains water supply (not shown) and is used to deliver water to a domestic dwelling, a part of an external wall 14 of the domestic dwelling being shown in FIG. 1.

The internal end 16 of the existing pipe will ordinarily be connected to the water system of the dwelling, but the pipe has been cut off adjacent its entry into the dwelling (this being a standard step in a method to replace the pipe 10).

The external end 20 of the existing pipe 10 is located underground. In most applications of the invention the external end 20 will be connected to the stopcock located at the edge of the property, but it is also possible to cut the pipe anywhere along its length so as to create the external end of the existing pipe to be replaced. In FIG. 1 the external end 20 has been located in the access pit 22 for the stopcock, and the stopcock has been removed. FIG. 1 does not show the stopcock or the mains pipe which would also be connected to the stopcock within the access pit 22, since neither of these components are directly relevant to the present invention.

The floor of the dwelling has a layer of concrete 24. To facilitate replacement of the existing pipe 10 the layer of concrete 24 has been removed adjacent to the internal end 16. The remainder of the length of the existing pipe 10 passes through earth 12.

To provide the force necessary to remove the existing pipe 10 a winch 26 is located adjacent to the access pit 22. The winch is connected to a pulley wheel 30 which will serve to redirect the (vertical) force of the winch 26 into the necessary horizontal force to remove the existing pipe 10. It will be understood, however, that the location of the winch 26 above the access pit 22, and the provision of a pulley wheel 30, are dependent upon the location of the external end 20 of the existing pipe 10, and in other applications the access pit 22 may be large enough to accommodate the winch 26 directly, for example.

In common with prior art pipe replacement methods, the first steps are to locate the ends of the existing pipe 10, and to cut the pipe (or remove connected componentry) in order to define the ends 16, 20 of the existing pipe. A cable (not shown in FIG. 1 but see the cable 32 in FIG. 2) is then fed along the existing pipe 10.

Figure 2:
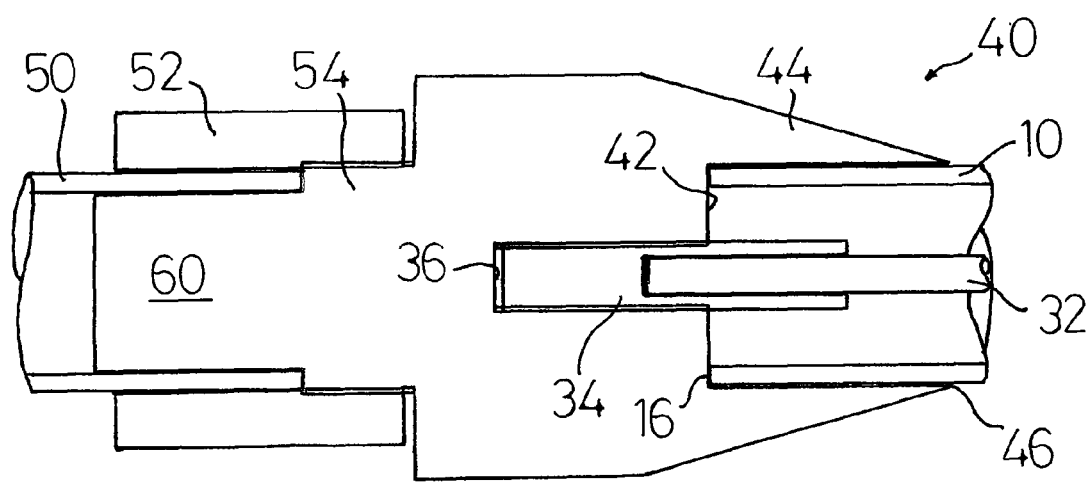
FIG. 2 shows a sectional view of one embodiment of a component fitted to the existing and replacement pipes.

In the embodiment of FIG. 2, the free end of the cable 32 has a connector 34 permanently secured thereto (e.g. by crimping). The connector 34 is externally threaded so as to be fittable into a correspondingly threaded opening 36 in a component 40. Following passage of the cable 32 through the existing pipe 10 the component 40 is thereby securely connected to the cable 32. Such a cable 32 can be fed along the existing pipe 10 from either end.

In an alternative arrangement, the component has a through-hole large enough to accommodate the cable, and the end of the cable is fitted with a stop which is too large to pass through the through-hole. The cable is first fed through the component and then through the existing pipe from the second end to the first end. When the cable is pulled from the first end the stop engages the component and causes the tension force to be transmitted to the component.

The component 40 has an abutment surface 42 which is use engages the internal end 16 of the existing pipe 10. The component 40 also has a collar 44 which surrounds the internal end 16 of the existing pipe 10. The collar 44 is tapered and has a leading edge 46 which is of a diameter only slightly larger than the external dimension of the existing pipe 10. The tapering form of the collar 44 and the leading edge 46 facilitate passage of the component 40 through the earth surrounding the existing pipe 10.

Either before it is fitted to the cable 32, or after it is fitted to the cable, the component 40 is also connected to the leading end of the replacement pipe 50. In this embodiment the connection is by way of a clamp ring 52 which is in threaded engagement with a boss 54 of the component 40 and clamps the leading end 56 upon an extension 60 of the boss 54 which lies within the leading end 56. It will be understood that this fitment of the replacement pipe to the component 40 is only one way of making this connection, and any suitable means of connecting the replacement pipe 50 to the connector 40 could be used with the present invention.

In the embodiment shown the replacement pipe 50 is of the same internal and external dimensions as the existing pipe 10, but that is not necessarily the case. It may be, for example, that the reason for replacing the existing pipe 10 is because of an increasing water demand at the dwelling, so that the replacement pipe 50 is of larger internal dimension than the existing pipe 10. In any event, however, the component 40 is of larger maximum cross-sectional dimension than the replacement pipe, so that once the component 40 has been forced through the earth surrounding the existing pipe hole the replacement pipe can readily follow. This is valuable is avoiding damage to the replacement pipe, and reducing the load-bearing requirement of the connection to the replacement pipe.

The other end of the cable 32 is connected to the winch 26 by way of the pulley wheel 30, and the cable 32 is drawn back along the existing pipe 10. Sufficient force is generated by the winch 26 to pull the existing pipe 10 together with the cable 32. It will be understood that with an existing pipe 10 of copper, lead or plastic the tendency of the existing pipe is to compress or otherwise deform adjacent to the internal end 16. Only when the section of existing pipe adjacent to the internal end 16 has compressed or deformed does a significant tension force pass to the next section of the existing pipe 10 which itself compresses or deforms, and so on. It will be understood that as each section of existing pipe 10 compresses or deforms, the frictional engagement to the surrounding earth is broken or much reduced, so that the frictional engagement is broken gradually along the length of the existing pipe 10.

It will also be understood that the tension force upon the cable 32 acts to keep the existing pipe 10 generally in line as it compresses and deforms, i.e. there is no tendency for the existing pipe 10 to buckle out of alignment with the existing pipe hole. Accordingly, the compression and deformation of the existing pipe is predominantly internal, i.e. the pipe generally compresses and deforms toward the cable 32 running through it.

The existing pipe 10 has a bend 62 (FIG. 1). It will be understood that with an existing pipe 10 of copper, lead or plastic, sufficient force can be applied either to widen the hole through which the pipe 10 passes, and/or to straighten out the pipe 10 so as to pass the bend in the pipe hole.

The winch 26 in this embodiment is an electric winch fed by a 12V (vehicle) battery. Winches of this type are available with a capacity of 2 tonnes, such a capacity being expected to be able to remove a copper, lead or plastic pipe many meters long, including bends, so that it will be suitable for replacing most water and gas pipes serving domestic dwellings. However, winches with larger capacities are available if desired or required for a particular application.

When the existing pipe 10 has been fully removed, the replacement pipe 50 will have been pulled through the pipe hole and will span the distance between the access pit 22 and the domestic dwelling. The component 40 is removed from the external end of the replacement pipe 50 and the replacement pipe is connected to the stopcock in known fashion. Also, the internal end of the replacement pipe is cut (if necessary) and connected to the water system of the dwelling, again in known fashion.

The compression and deformation of the existing pipe 10 is expected to make it difficult to separate the cable 32 from the existing pipe 10 after this has been removed. Specifically, after removal of the existing pipe 10 that pipe and the cable 32 will be wound together around a spool of the winch 26.

Figure 3:
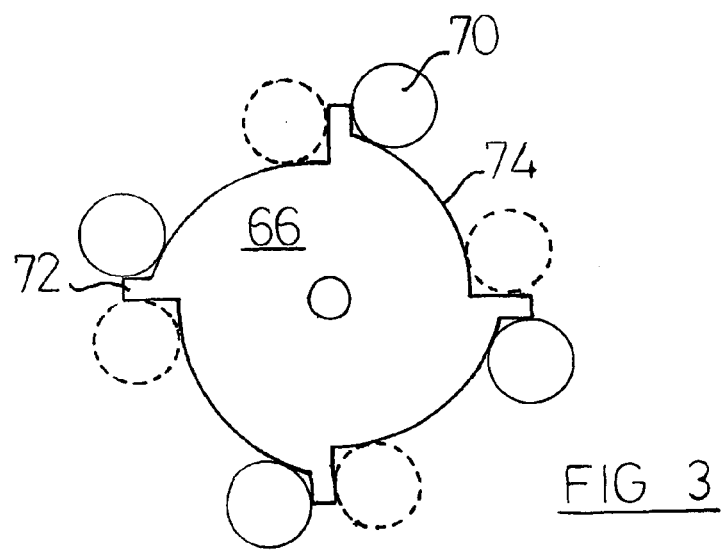
FIG. 3 shows a part of the spool of the winch mechanism.

FIG. 3 shows a part of a spool 64 of the winch 26, the spool 64 being adapted to allow easy removal of a used cable 32 and removed existing pipe 10. The spool 64 has a pair of substantially identical end plates 66 (only one of which is seen in the end view of FIG. 3). The end plates each carry four bars 70, the four bars spanning the distance between the end plates 66. The cable 32 and existing pipe 10 (not shown) are wound around the bars 70.

The end plates 66 are formed in such a way as to define two positions for the bars 70. The first (working) position is shown in FIG. 3 with the bars 70 in solid outline. In this first position, each of the bars 70 engages a stop 72 and the distance between the bars 70 (and therefore the length of the periphery of the spool provided thereby) is maximised. It is arranged that the bars 70 are placed into their first positions prior to winding of the cable 32, and it is also arranged that the winch 26 winds the spool in a direction in which the end plates 66 rotate clockwise, so that the bars 70 are forced against their respective stops 72.

When the existing pipe 10 has been removed and is wound around the bars 70 together with the cable 32, the end plates 66 are rotated counter-clockwise relative to the bars 70, which causes the bars 70 to move away from their respective stops 72 and along and down the inclined ramps 74. When the bars 70 reach the bottom of their respective ramps 74 they are in their second (removal) position as shown in dotted outline. In this position the distance between the bars 70, and therefore the length of the periphery of the spool provided thereby, is minimised, so that the wound cable and existing pipe becomes loose and can be slid off the bars 70 for disposal. Specifically, the cable and existing pipe can be delivered to a dedicated facility for separation of the different materials. Even if the cable 32 cannot be returned to the operator and reused it is a relatively inexpensive component compared with the cost of alternative methods of removing the existing pipe.

It would of course be possible to provide the tension force by means other than a winch. For example the cable 32 could simply be connected to a vehicle such as a tractor or back-hoe loader, such an arrangement perhaps not requiring the pulley wheel 30.

As above indicated, it is envisaged that certain pipes, particularly those of lead, might deform to a greater extent than desired when being removed, and form an enlarged mass of material with a cross-sectional diameter greater than that of the existing pipe 10 and perhaps also the component 40. One method of reducing the likelihood of such extreme deformation is to fill all or part of the existing pipe with a material which will support the pipe wall during removal of the existing pipe. This can readily be achieved by filling the existing pipe with a settable fluid, the fluid prior to setting having a low enough viscosity to permit substantially complete filling of the existing pipe (including filling what may be a very small gap between the cable 32 and the pipe wall), but after setting being sufficiently incompressible and rigid to avoid significant leakage whilst supporting the pipe wall.

The inventor has discovered that a two-part epoxy resin, specifically a two-part polyurethane resin, can be produced to have the required characteristics. Eli-Chem Resins UK Limited, of Astra House, The Common, Cranleigh, GU6 8RE produce many different epoxy resin materials, one of which is sold under their trade name "PU238". That particular material is suitable in certain applications, but the inventor has used a modified version of that resin with a lower viscosity, ensuring more complete filling of the pipe.

The resin which is used has the following desirable characteristics (most of which are shared with PU238), namely:

It has a pot life of more than five minutes (actually around 7 minutes) at 10° C.—the pot life is the time after mixing of the two components of the resin before it begins to harden, and therefore represents the time available to fill the pipe.

It has a curing (or gel) time of less than 60 minutes (actually around 30 minutes) at 10° C.—the curing time is the time after mixing of the two components after which it is sufficiently hard to support the pipe. This time should be short so as to avoid unnecessary delay.

It has a low viscosity prior to curing (actually around 1700 cps spindle 6 at 25° C.) and so can readily flow into and fill an existing pipe.

It is not rigid, and can therefore deform if the existing pipe is required to straighten or bend.

It is of sufficiently low cost not to significantly affect the cost of removing an existing pipe.

It adheres to the pipe wall so as to enhance the support provided thereto.

As regards the adherence to the, pipe wall, the resin used by the inventor has an adhesive strength of 10 N/mm$^2$ with a lead pipe and 11 N/mm$^2$ with a copper pipe. In addition, it has a tear strength of 12 N/mm$^2$, and a tensile strength of 12 N/mm$^2$.

The characteristics identified above are the major characteristics for a suitable settable fluid, and a suitable epoxy resin having these characteristics can be produced by suitable suppliers such as Eli-Chem Resins UK Ltd. Slightly more viscous settable fluids, and settable fluids with shorter pot lives and longer curing times for example, can be used but are not preferred.

The invention claimed is:

1. A method of replacing an existing pipe, including the steps of:
    {i} locating the ends of the existing pipe to be replaced;
    {ii} opening the ends of the existing pipe to define a first end and a second end;
    {iii} connecting a cable to a component at the second end, the component also being connected to a replacement pipe;
    {iv} passing the cable along the existing pipe;
    {v} injecting a settable fluid into the existing pipe, and allowing the settable fluid to set, after the cable has been passed along the existing pipe, the settable fluid setting into a non-rigid material; and
    {vi} pulling the cable from the first end;
wherein the component is adapted to engage the second end of the existing pipe, and wherein the step of pulling the cable from the first end acts to remove the existing pipe, the force provided by pulling the cable from the first end being the only force acting to remove the existing pipe.

2. The method according to claim 1 in which the cable is connected to the component at the second end and then passed along the existing pipe from the second end to the first end.

3. The method according to claim 1 in which at least part of the existing pipe is located underground, and in which the existing pipe includes one or more bends.

4. The method according to claim 1 in which the settable fluid is a two-part epoxy resin having a pot life of more than 5 minutes at 10° C., a curing time of less than 60 minutes at 10° C., and a viscosity of less than 2000 cps spindle 6 at 25° C.

5. An apparatus for replacing an existing underground pipe, the existing pipe having a first end and a second end, the apparatus comprising:
    {i} a cable for insertion into the existing pipe,
    {ii} a component adapted for connection to the end of the cable and for connection to a replacement pipe, the component having an abutment surface adapted to engage the second end of the existing pipe,
    {iii} a settable fluid adapted to set within the existing pipe into a material which is non-rigid but adapted to provide support for the existing pipe as it is subsequently pulled through the earth, and
    {iv} a single means for providing a force to remove the existing pipe in use, said single means being adapted to pull the cable from the first end of the existing pipe and comprising a winch which is adapted to pull the cable with a force of at least two tonnes, the winch being free-standing and portable and constructed from separable elements.

6. The apparatus of claim 5 in which the abutment surface is surrounded by a collar adapted to surround the second end of the existing pipe.

7. The apparatus of claim 6 in which the collar is externally tapered.

8. The apparatus of claim 5 in which the component has a larger cross-sectional dimension than the replacement pipe.

* * * * *